United States Patent
Lewis

[11] 4,057,719
[45] Nov. 8, 1977

[54] FIBER OPTICS ELECTRO-MECHANICAL LIGHT SWITCH

[75] Inventor: Adolph Lee Lewis, La Mesa, Calif.

[73] Assignee: The United States of America as represented by the Secretary of the Navy, Washington, D.C.

[21] Appl. No.: 718,285

[22] Filed: Aug. 27, 1976

[51] Int. Cl.² .............................................. G02B 5/14
[52] U.S. Cl. ................................... 250/227; 350/96 C
[58] Field of Search ....................... 350/96 WG, 96 C; 250/227, 229

[56] References Cited

U.S. PATENT DOCUMENTS

| 3,676,689 | 7/1972 | Knepper | 250/227 |
| 3,856,127 | 12/1974 | Halfon et al. | 350/96 C |

*Primary Examiner*—David C. Nelms
*Attorney, Agent, or Firm*—R. S. Sciascia; G. J. Rubens; J. W. McLaren

[57] ABSTRACT

An electro-mechanically actuated light switch is provided for transferring light energy into or out of a fiber optic light transmission path. Liquid material contained within the switch provides a continuity between two fiber optic terminals in the fiber optic light transmission path. The liquid material is chosen to have an index of refraction higher than the material which contains it, so that substantially total internal reflection is sustained along the optical axis of the fiber optic light transmission path. A transparent member is movably mounted in a port in the switch and resiliently supported for extension into the liquid material. An electromagnetic-solenoid arrangement is adapted to extend an angularly disposed reflective end of the transparent member into the liquid material for redirecting light energy which it intercepts. Such redirected light energy in the form of light intercepted in the optical path may be detected by a suitable sensor; alternatively light signals from a suitable source such as a light emitting diode may be introduced into the transparent member and reflected to propagate along the optical path.

7 Claims, 2 Drawing Figures

FIBER OPTICS ELECTRO-MECHANICAL LIGHT SWITCH

BACKGROUND OF THE INVENTION

Recent development and adaptation of optical techniques for applications to communications, data processing, and similar transmission systems has numerous advantages as compared with electronic systems which have comparable functional objectives.

Low-loss, high quality, multi-mode fiber optic cable has been developed which renders optical communication, data processing, and signal transmission systems feasible, practical, and desirable. Some of the advantages of fiber optic cables used in such systems include greatly reduced size, weight, and cost; electrical isolation which eliminates grounding and ground loops; reduced constraints relative to impedance matching; and, easy coupling to common logic circuitry by use of available light sources and detectors. Moreover, fiber optic cables permit high channel isolation, easy interchangeability with electrical cable, and greatly reduced electromagnetic interference.

One of the most important advantages offered by fiber optic cables in military use is their characteristic immunity to radio frequency signals and the fact that the transmitted light signals are contained wholly within the cables. In ground communication systems, this obviously greatly increases transmission security. The use of optical cables also eliminates cross talk and optical paths provided by such fiber optic cables are resistant to electromagnetic interference from other equipment on air craft, vessel, or vehicle and even immune to electromagnetic pulses, such as may be generated by nuclear explosions.

In such optical systems, there is a need for optical couplers which are connectable to fiber optic cables, for example, to provide the capability of intercepting and extracting signal information from an optical path, as well as introducing signal information into that optical path.

Additionally, it is desirable that such a coupler be selectively operable to redirect light energy signals into or out of the optical path as desired and, in such selective operation, be remotely controllable if desired.

SUMMARY OF THE INVENTION

The principal functional objective of the present invention has a two-fold aspect, the first of which is to couple light out of an optical path, and the second of which is to introduce light energy signals into an optical path. The light switch of the present invention is electro-mechanically operated for transferring light energy relative to a fiber optic light transmission path.

In its preferred embodiment, a body member having a cylindrical bore of substantially optical smoothness is configured to receive a fiber optic terminal at each end. Typically, the body member may be made of glass or other suitable material having ends threaded to receive and secure fiber optic terminals. A window fabricated of material substantially transparent to the wavelengths of light energy transmitted by the fiber optic light transmission path is supported in each end of the body member contiguous to each of the fiber optic terminals.

A selected liquid material substantially fills the cylindrical bore of the body member between the windows and has an index of a refraction higher than that of the body member for sustaining substantially total internal reflection along the optical axis of the cylindrical bore, thus minimizing light losses within the light switch assembly. A port in the body member is disposed transverse relative to the optical axis of its cylindrical bore; a transparent member is movably mounted in the port and resiliently supported relative to the body member for extending into the liquid material.

The transparent member has an angularly disposed reflective end which redirects light energy when extended into the liquid material. Suitable ferromagnetic material is fixed to the transparent member and an electrically conductive coil supported on the body member for electromagnetic flux linkage with the ferromagnetic element is arranged to be selectively connected to a source of electrical energy. Accordingly, the transparent member with the angularly disposed reflective end is extended into the light transmission path against its resilient support upon the actuation of the electrically conductive coil and its associated ferromagnetic member which functions in the manner of a solenoid.

Upon disconnection of the source of electrical energy, the resilient support of the transparent member functions to withdraw it from its extended position in the liquid material of the light switch assembly. Accordingly, the concept and teaching of the present invention contemplates a light switch which is selectively operable to perform its switching function in response to electrical actuation. In the absence of such electrical actuation, the light switching element assumes a noninterfering, nonintercepting disposition relative to the light transmission path.

Those knowledgeable and skilled in the pertinent arts will appreciate that since the light switch of the present invention is electrically actuated, it is readily adapted to remotely controlled operation which may be desirable in many functional applications within communications, data processing, and similar optical signal transmission systems.

Accordingly, the primary object of the present invention is to provide an improved light switch for transferring light energy relative to to a fiber optic light transmission path with minimal light losses of optical energy propagating along such light transmission path.

Another important object of the present invention is to provide such a light switch which is selectively operative for transferring light energy relative to a fiber optic transmission path.

A further object of the present invention is to provide such a light switch which assumes a nonintercepting, noninterfering condition when it is not transferring light energy.

Yet another important object of the present invention is to provide such a light switch which is readily adapted to transfer light energy into or out of a fiber optic light transmission path as desired.

A further object of the present invention is to provide a light switch which is electrically actuatable for transferring light energy relative to a fiber optic light transmission path so that it may be remotely controlled as well as selectively operable to perform its switching function.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENT

Figure 1:
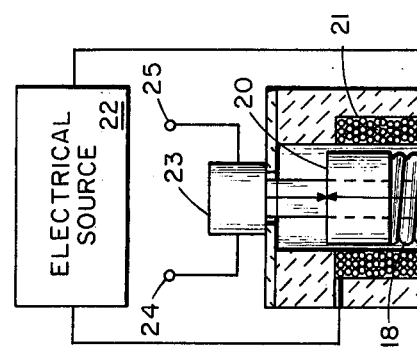
FIG. 1 is a cross-sectional illustration of a preferred embodiment of the present invention; and, FIG. 2 is an illustration of the electrically actuatable portion of the embodiment of FIG. 1 in its unactuated condition.
Figure 1:
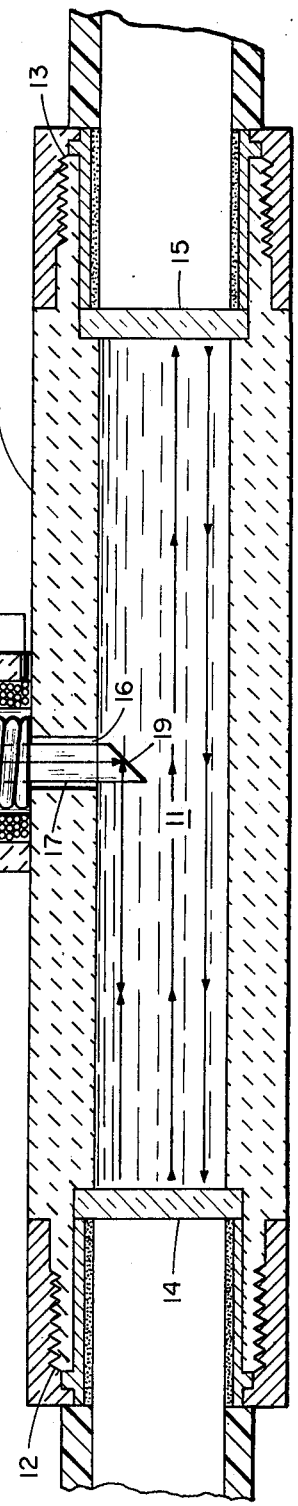

FIG. 1 illustrates a preferred embodiment of the present invention. A body member 10 has a cylindrical internal bore 11 which is preferably of substantially optical smoothness so as to minimize losses of light energy propagated therethrough. The body member 10 may be fabricated of optical glass or other suitable materials including certain plastics, for example, and is configured with suitable means such as the threaded ends, 12 and 13 for coupling with a fiber optic terminal at each end.

Windows 14 and 15 are supported at each end of the body member 10 contiguous to each fiber optic terminal and are fabricated of material substantially transparent to the wavelengths of energy transmitted by the fiber optic light transmission path in which the light switch of the present invention is employed.

In a preferred embodiment of the present invention a small amount of suitable liquid material may be used to complete the interface between the fiber optic terminals and the respectively contiguous windows 14 and 15. A selected liquid material substantially fills the entire cylindrical bore 11 between the windows 14 and 15 to complete the optical path between the fiber optic terminals; the liquid material is selected to have an index of refraction higher than that of the body member 10 for sustaining substantially total internal reflection along the optical axis of the cylindrical bore of the body member 10.

A port 16 in body member 10 is disposed transversally relative to the optical axis of its cylindrical bore. A transparent member 17 is movably mounted in the port 16 and resiliently supported relative to the body member 10 by a suitable means, such as the coil return spring 18. An O-ring or other suitable may be employed to seal the transparent member 17 within the port 16.

The transparent member 17, which may be fabricated of a suitable glass or plastic rod material, has an angularly disposed end 19 which supports a reflective coating. In a preferred embodiment of the present invention, the reflective end 19 may be disposed at a 45° angle relative to the principle axis of the transparent member 17 and the principal axis of the fiber optic light transmission path. If desired, the reflective coating may be wavelength selective to act only upon wavelengths of light energy within a predetermined wavelength region.

A ferromagnetic element 20 is affixed to the movable transparent member 17 and is adapted to coact with an electrically conductive coil 21 supported on the body member 10 in response to electromagnetic flux linkage therewith. A source of electrical energy 22, which may preferably include a suitable electrical switch means, is adapted to be selectively connectable to energize the electrically conductive coil 21.

A suitable light energy sensor or light signal source 23 may be affixed at or adjacent to the end of the transparent member 17.

OPERATION

In its operation, the present invention performs the function of extracting light energy from, or introducing additional light energy signals into, a fiber optic light transmission path. The fiber optic light transmission path is completed by the liquid filled cavity 11 of the body member 10 as shown in FIG. 1.

Figure 2:
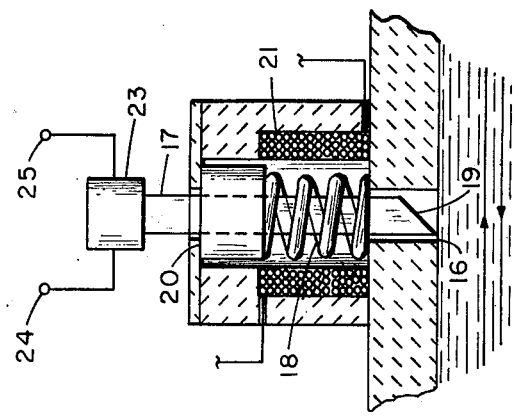

In an absence of electrical actuation, the selectively operative light switch of the present invention is in the position illustrated in FIG. 2 where the transparent member 17 is withdrawn from the liquid filled cavity 11 so that the reflective end 19 is not in the fiber optic light transmission path. The movable transparent member 17 is retained in this position by the resilient return coil spring 18 and when the switch is in the condition illustrated in FIG. 2, light energy will neither be intercepted for redirection out of the fiber optic light transmission path, nor will additional light energy signals be introduced into the fiber optic light path transmission path.

However, upon the actuation of the light switch of the present invention by its connection to the electrical source 22 as illustrated in FIG. 1 through a suitable electrical switch (which may be included in the electrical source 22), electromagnetic flux linkage between the ferromagnetic element 20 and the electrically conductive coil 21 causes downward movement of the transparent member 17, compressing the return coil spring 18 and extending the reflective angularly disposed end face 19 into the fiber optical light transmission path.

In the actuated condition illustrated in FIG. 1, light energy signals traversing the fiber optic light transmission path along the optical axis of the cylindrical bore 11 of the body member 10 are in part reflected out of the fiber optic light transmission path and along the principal axis of the transparent member 17 to be received by element 23 which may comprise a suitable light energy sensor developing commensurate electrical signals at its terminals 24 and 25. In this manner, the electro-mechanically operated light switch of the present invention functions to transfer light energy out of a fiber optic light transmission path.

Alternatively, however, element 23 may include a source of light energy signals such as light emitting diode, for example, and upon the application of suitable electrical signals to its terminals 24 and 25 will generate commensurate light signals which in turn will be transmitted along the principal axis of the transparent member 17 to be redirected by the reflective face of the angularly disposed end 19 for transmission along the fiber optic light transmission path when the light switch is in its actuated condition as shown in FIG. 1.

Accordingly, it will be readily appreciated by those knowledgeable and skilled in the pertinent arts that the electro-mechanically operable switch of the present invention may be employed either to extract light energy signals from a fiber optic light transmission path, or to introduce additional light energy signals into such a fiber optic light transmission path.

Moreover, the light switch of the present invention does not intercept the fiber optic light transmission path when it is in a nonactuated condition and therefore minimizes light losses when it is not operative for the purposes of transferring light energy into or out of the fiber optic light transmission path.

Additionally, because the light switch of the present invention is electrically actuated, it is readily adaptable to be remotely as well as selectively controlled, providing an additional desirable advantage in many optical light transmission systems.

The operation of the present invention can readily be rendered further selective by the use of a reflective surface which is responsive only to wavelengths of light energy within a desired wavelength region.

Obviously many modifications and variations of the present invention are possible in the light of the above teachings. It is therefore to be understood that within the scope of the appended claims the invention may be practiced otherwise than as specifically described.

What is claimed is:

1. An electro-mechanically operated light switch for transferring light energy relative to a fiber optic light transmission path comprising:
    a body member having a cylindrical bore of substantially optical smoothness and configured to receive a fiber optic terminal at each end;
    a window fabricated of material substantially transparent to the wavelengths of light energy transmitted by said fiber optic light transmission path and supported at each end of said body member contiguous to each said fiber optic terminal;
    a liquid material substantially filling said cylindrical bore between said windows and having an index of refraction higher than said body member for sustaining substantially total internal reflection along the optical axis of said cylindrical bore;
    a port in said body member disposed transversely relative to said optical axis;
    a transparent member movably mounted in said port and resiliently supported relative to said body member for extending into said liquid material;
    said transparent member having an angularly disposed reflective end for redirecting light energy when extended into said liquid material;
    a ferromagnetic element affixed to said transparent member;
    an electrically conductive coil supported on said body member for electromagnetic flux linkage with said ferromagnetic member; and
    a source of electrical energy adapted to be selectively connected to said electrically conductive coil.

2. An electro-mechanically operated light switch as claimed in claim 1 and including a light responsive sensor means supported contiguous to said transparent member for receiving light energy signals transmitted therethrough.

3. An electro-mechanically operated light switch as claimed in claim 1 and including a light signal emitting means supported contiguous to said transparent member for generating light signals commensurate with electrical signals impressed thereon.

4. An electro-mechanically operated light switch as claimed in claim 3 wherein said light signal emitting means comprises a light emitting diode.

5. An electro-mechanically operated light switch as claimed in claim 1 wherein said source of electrical energy includes a selectively actuatable switch means.

6. An electro-mechanically operated light switch as claimed in claim 1 wherein said reflective end of said transparent member is disposed at a 45° angle relative to the principal axis of said transparent member.

7. An electro-mechanically operated light switch as claimed in claim 1 wherein said angularly disposed reflective end of said transparent member is wavelength selective to reflect only light energy within predetermined wavelength regions.

* * * * *